(12) United States Patent
Buergi et al.

(10) Patent No.: US 10,708,302 B2
(45) Date of Patent: Jul. 7, 2020

(54) SYSTEMS AND METHODS FOR IDENTIFYING PHISHING WEB SITES

(71) Applicant: Swisscom AG, Bern (CH)

(72) Inventors: Ulrich Buergi, Bern (CH); Florian Angehrn, Bern (CH)

(73) Assignee: SWISSCOM AG, Bern (AU)

( * ) Notice: Subject to any disclaimer, the term of this patent is extended or adjusted under 35 U.S.C. 154(b) by 0 days.

(21) Appl. No.: 15/220,029

(22) Filed: Jul. 26, 2016

(65) Prior Publication Data
US 2017/0034211 A1   Feb. 2, 2017

(30) Foreign Application Priority Data

Jul. 27, 2015   (CH) ....................................... 1087/15

(51) Int. Cl.
*H04L 29/06*   (2006.01)
*G06F 21/56*   (2013.01)

(52) U.S. Cl.
CPC ........ *H04L 63/1483* (2013.01); *G06F 21/566* (2013.01); *H04L 63/1425* (2013.01)

(58) Field of Classification Search
CPC .......... G06F 21/50; G06F 21/57; G06F 21/60; G06F 21/566; H04L 63/1483; H04L 63/1425; H04L 29/06877; H04L 29/06884
USPC ....................................................... 726/22
See application file for complete search history.

(56) References Cited

U.S. PATENT DOCUMENTS

| | | | | |
|---|---|---|---|---|
| 7,120,934 | B2 * | 10/2006 | Ishikawa | H04L 12/12 726/23 |
| 7,373,665 | B2 * | 5/2008 | Williamson | H04L 63/0227 709/235 |
| 7,523,016 | B1 * | 4/2009 | Surdulescu | G06F 21/316 702/185 |
| 7,554,930 | B2 * | 6/2009 | Gaddis | H04L 45/02 370/254 |
| 7,630,987 | B1 * | 12/2009 | Renfro | H04L 63/1483 |
| 7,664,845 | B2 * | 2/2010 | Kurtz | G02B 5/3083 709/224 |

(Continued)

OTHER PUBLICATIONS

Extended European Search Report for Application No. 16181024, completion date Nov. 14, 2016, 8 pages.

*Primary Examiner* — Shahriar Zarrineh
(74) *Attorney, Agent, or Firm* — McAndrews, Held & Malloy, Ltd.

(57) ABSTRACT

Systems and methods are provided for automatically detecting phishing attacks. Network traffic may be monitored to detected phishing attacks and/or identify phishing websites and/or target websites. The monitoring may comprise generating and analysing logs corresponding to the monitored network traffic, with the logs comprising network traffic events and/or information relating to requesting and responding addresses. The network traffic events used in detecting phishing attacks may comprise sequences each comprising one or more requests and responses. Requested websites may be identified as phishing websites based on event sequences meeting particular criteria. Components and/or functions utilized for monitoring the network traffic and/or automatic phishing detection based thereon may be implemented as parts of a browser and/or network routers utilized during typical and normal use operations.

20 Claims, 2 Drawing Sheets

(56) References Cited

U.S. PATENT DOCUMENTS

| | | | | |
|---|---|---|---|---|
| 7,796,515 B2* | 9/2010 | Griffin | H04L 63/145 | 370/231 |
| 7,849,502 B1* | 12/2010 | Bloch | H04L 29/12066 | 726/11 |
| 7,854,001 B1* | 12/2010 | Chen | H04L 63/1441 | 726/11 |
| 7,865,953 B1* | 1/2011 | Hsieh | G06F 21/566 | 726/22 |
| 8,019,865 B2* | 9/2011 | Chang | H04L 41/0631 | 709/224 |
| 8,141,150 B1* | 3/2012 | Krishnamurthy | H04L 63/1483 | 726/22 |
| 8,205,258 B1 | 6/2012 | Chang et al. | | |
| 8,321,934 B1* | 11/2012 | Cooley | G06F 21/56 | 709/227 |
| 8,381,292 B1* | 2/2013 | Warner | H04L 51/12 | 705/50 |
| 8,468,597 B1* | 6/2013 | Warner | G06Q 10/10 | 705/50 |
| 8,495,735 B1* | 7/2013 | Warner | H04L 51/12 | 705/50 |
| 8,578,468 B1* | 11/2013 | Yadav | H04L 63/08 | 713/154 |
| 8,689,341 B1* | 4/2014 | Hartmann | H04L 63/1483 | 713/188 |
| 8,695,091 B2* | 4/2014 | Komili | H04L 63/102 | 705/14.4 |
| 8,713,141 B1* | 4/2014 | Liu | H04L 63/1425 | 709/223 |
| 8,776,196 B1* | 7/2014 | Oliver | H04L 63/1483 | 726/11 |
| 8,990,933 B1* | 3/2015 | Magdalin | H04L 63/1483 | 709/229 |
| 9,027,128 B1* | 5/2015 | Oliver | H04L 63/1408 | 726/22 |
| 9,043,894 B1 | 5/2015 | Dennison et al. | | |
| 9,325,730 B2* | 4/2016 | Higbee | H04L 63/1416 | |
| 9,398,038 B2* | 7/2016 | Higbee | H04L 63/1483 | |
| 9,621,566 B2* | 4/2017 | Gupta | H04L 63/1408 | |
| 9,684,888 B2* | 6/2017 | Shraim | G06Q 10/107 | |
| 10,091,222 B1* | 10/2018 | Langton | H04L 63/1425 | |
| 2003/0070096 A1* | 4/2003 | Pazi | H04L 29/12066 | 726/4 |
| 2004/0083372 A1* | 4/2004 | Williamson | G06F 21/566 | 713/188 |
| 2006/0137009 A1* | 6/2006 | Chesla | G06F 21/552 | 726/22 |
| 2006/0253581 A1* | 11/2006 | Dixon | G06Q 30/02 | 709/225 |
| 2007/0094491 A1* | 4/2007 | Teo | H04L 63/1408 | 713/153 |
| 2007/0094500 A1* | 4/2007 | Shannon | G06F 21/645 | 713/170 |
| 2007/0192855 A1* | 8/2007 | Hulten | G06F 17/30887 | 726/22 |
| 2008/0028467 A1* | 1/2008 | Kommareddy | H04L 63/1458 | 726/23 |
| 2008/0141342 A1* | 6/2008 | Curnyn | H04L 63/0227 | 726/3 |
| 2008/0295173 A1* | 11/2008 | Tsvetanov | H04L 63/1425 | 726/23 |
| 2008/0307090 A1* | 12/2008 | Pearson | G06Q 10/10 | 709/225 |
| 2009/0044276 A1* | 2/2009 | Abdel-Aziz | H04L 63/1425 | 726/24 |
| 2009/0077383 A1* | 3/2009 | de Monseignat | H04L 63/0823 | 713/175 |
| 2009/0157675 A1 | 6/2009 | Stellhorn et al. | | |
| 2010/0046393 A1* | 2/2010 | Knapp | H04L 41/0609 | 370/253 |
| 2010/0050256 A1* | 2/2010 | Knapp | H04L 63/1425 | 726/22 |
| 2010/0138919 A1* | 6/2010 | Peng | H04L 29/12009 | 726/22 |
| 2010/0186088 A1* | 7/2010 | Banerjee | G06F 21/51 | 726/23 |
| 2011/0138463 A1* | 6/2011 | Kim | H04L 63/1425 | 726/22 |
| 2011/0214187 A1* | 9/2011 | Wittenstein | H04L 61/6063 | 726/25 |
| 2011/0302653 A1* | 12/2011 | Frantz | G06F 21/552 | 726/22 |
| 2012/0047581 A1* | 2/2012 | Banerjee | G06F 21/554 | 726/24 |
| 2012/0079101 A1* | 3/2012 | Muppala | H04L 63/0236 | 709/224 |
| 2012/0110171 A1* | 5/2012 | Luna | A61L 33/10 | 709/224 |
| 2012/0158626 A1 | 6/2012 | Zhu et al. | | |
| 2012/0174220 A1* | 7/2012 | Rodriguez | H04L 63/1416 | 726/23 |
| 2012/0216248 A1* | 8/2012 | Alperovitch | H04L 63/1425 | 726/1 |
| 2012/0278886 A1* | 11/2012 | Luna | G06F 21/552 | 726/22 |
| 2013/0036468 A1* | 2/2013 | Georgiev | H04L 61/1511 | 726/23 |
| 2013/0047210 A1* | 2/2013 | Rotman | G06F 21/31 | 726/3 |
| 2013/0086677 A1* | 4/2013 | Ma | G06F 17/3089 | 726/22 |
| 2013/0333032 A1* | 12/2013 | Delatorre | H04L 63/1441 | 726/23 |
| 2013/0333038 A1* | 12/2013 | Chien | H04L 63/1408 | 726/23 |
| 2013/0347071 A1* | 12/2013 | Polo Moragon | H04L 63/0853 | 726/3 |
| 2014/0090053 A1* | 3/2014 | Simske | H04L 63/105 | 726/22 |
| 2014/0096242 A1* | 4/2014 | Dong | H04L 63/1483 | 726/22 |
| 2014/0150051 A1* | 5/2014 | Bharali | H04L 61/1511 | 726/1 |
| 2014/0230064 A1* | 8/2014 | Higbee | G06Q 10/107 | 726/25 |
| 2015/0058976 A1* | 2/2015 | Carney | H04L 63/1458 | 726/22 |
| 2015/0067839 A1* | 3/2015 | Wardman | G01F 11/263 | 726/22 |
| 2015/0128272 A1* | 5/2015 | Chen | G06F 16/951 | 726/23 |
| 2015/0229609 A1* | 8/2015 | Chien | H04L 63/101 | 726/13 |
| 2015/0326606 A1* | 11/2015 | Chen | H04L 63/1483 | 726/23 |
| 2016/0006749 A1* | 1/2016 | Cohen | G06F 16/285 | 726/23 |
| 2016/0021141 A1* | 1/2016 | Liu | H04L 63/1433 | 726/23 |
| 2016/0057167 A1* | 2/2016 | Bach | H04L 63/1483 | 726/23 |
| 2016/0063218 A1* | 3/2016 | Nachenberg | G06F 21/10 | 726/26 |
| 2016/0063541 A1* | 3/2016 | Geng | H04L 63/1483 | 705/14.47 |
| 2016/0156641 A1* | 6/2016 | Kondapalli | H04L 63/1408 | 726/22 |
| 2016/0161468 A1* | 6/2016 | Keays | G01N 33/4972 | 73/23.3 |
| 2016/0285894 A1* | 9/2016 | Nelms | H04L 63/145 | |
| 2016/0381056 A1* | 12/2016 | Floering | G06F 21/51 | 726/23 |

* cited by examiner

US 10,708,302 B2

SYSTEMS AND METHODS FOR IDENTIFYING PHISHING WEB SITES

CLAIM OF PRIORITY

Pursuant to 35 U.S.C. § 119, this patent application claims the filing date benefit of, and right of priority to Swiss (CH) Patent Application No. 01087/15, filed Jul. 27, 2015. The above application is hereby incorporated herein by reference in its entirety.

TECHNICAL FIELD

The present disclosure relates to networking. In particular, various embodiments in accordance with the present disclosure relate to systems and methods for automatic detection of phishing websites.

BACKGROUND

Conventional methods and systems for detecting phishing websites, if any existed, can be costly, cumbersome and inefficient. In this regard, the term "phishing" generally refers to the concept of tricking a user (e.g., a computer user) into submitting personal information to a bogus website. Phishing may also refer to the techniques used to trick users. The personal information, such as generally private identifying information, login information for online banking, financial information (e.g., credit card numbers), and other valuable information, is then often used to commit fraud, including identity theft.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY

Systems and/or methods are provided for identifying a phishing website, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the disclosure will become apparent from the following description of non-limiting exemplary embodiments, with reference to the appended drawings, in which.

DETAILED DESCRIPTION OF THE DISCLOSURE

Figure 1:
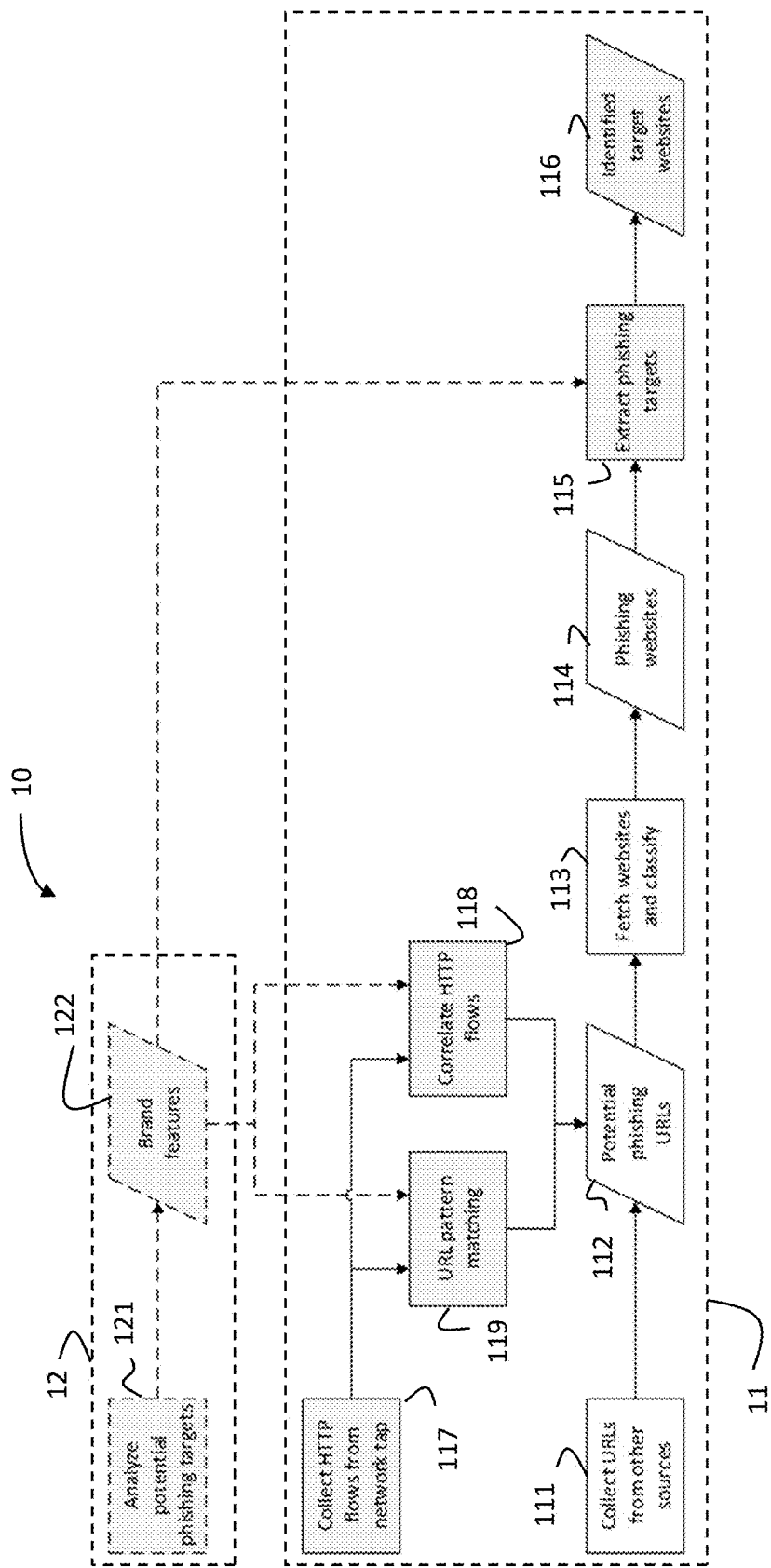
FIG. 1 is a block diagram illustrating components of an example phishing detection system, in accordance with the present disclosure.

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Certain example implementations in accordance with the present disclosure may be found in systems and methods for identifying phishing websites, as described in the following in more detail with reference to the attached figures. In this regard, the term "phishing" generally refers to the concept of tricking a user (e.g., computer user) into submitting personal information to a bogus website. Phishing may also refer to the techniques used to trick users. The personal information, such as generally private identifying information, login information for online banking, financial information (e.g., credit card numbers), and other valuable information, is then often used to commit fraud, including identity theft.

Various phishing tactics are used. One example common phishing tactic is to send an email message or instant message to a large number of users. The identity of the message sender and the message content may be arranged to look like it originated from legitimate business or person. The message may indicate that the user needs to re-submit some personal data so that the business can continue to serve the user. The email message may contain a link to a bogus website that may look virtually identical to the pages offered by the legitimate site. Because links may be difficult to read and can use foreign characters that look like normal characters to the user, users can be fooled into visiting the bogus Website and providing valuable personal data.

Protection from phishing may be provided through user awareness and education to help recipients of phishing communications to distinguish between genuine and fraudulent messages. However, this approach is resource intensive and often may be unsuccessful. In this regard, as phishing attacks become more and more sophisticated, even experienced users may struggle to distinguish between phishing and legitimate communications.

Thus, more advanced and automated solutions have been pursued. In this regard, network companies, ISPs (Internet Service Providers), browser providers and the like are active in developing automated tools and methods to detect phishing attempts prior to the users' exposure to a fraudulent communications, in order to prevent the phishing attack or at least to warn users that the received message could be a phishing attempt.

For example, some of the more common automated protection approaches against phishing are based on an analysis and comparison of the Universal Resource Locator (URL) as requested by a link within the phishing email or message. In this regard, the URL may be compared against entries in pre-defined database (e.g., databases storing identified phishing websites, such as the one provide by Phishtank at https://www.phishtank.com/ of known phishing sites ("black list"), or databases storing address information for known legitimate target sites). The analysis and comparison may be limited to the URL as such or to an analysis of the phishing website—e.g., by comparison of elements of the phishing website with legitimate target websites. Some of the automated protection approaches against phishing may use textual features (e.g., company name, domain name) to identify phishing webpages that match a certain protectable webpage. Relatively few, if any, of the available automated protection approaches use visual features. In this regard, with such approaches complete screenshots of websites (e.g., the ones in the suspected phishing messages vs. the known legitimate ones) may be compared. Other approaches may use sub parts of the webpage (i.e. text block, images, logos) for identification. The extracted features are used in the known methods as a critical part of the classification process.

Given the large number and the varied and constantly evolving nature of phishing attacks, however, providing entirely machine based systems and methods capable of detecting attacks with a satisfactory degree of accuracy may be complex task, even for already available common automated approaches. Further, it is often not sufficient to solve the problem of automating the task of identifying phishing websites through a single method. Rather, for maximal protection it may be desirable to combine several detection methods.

FIG. 1 is a block diagram illustrating components of an example phishing detection system, in accordance with the present disclosure. Shown in FIG. 1 is an exemplary phishing detection system 10.

The phishing detection system 10 may comprise suitable circuitry for implementing various aspects of the present disclosure. In this regard, each of the components of the phishing detection system 10, as depicted in FIG. 1 and/or described hereafter, may comprise suitable circuitry (including, e.g., general or dedicated processing circuitry, storage circuitry, communication-related circuitry, etc.) that is operable to implement various aspects of the present disclosure.

For example, the phishing detection system 10 may operate in a first mode using the components and steps 11 linked by solid arrows, or in a second mode further including the components and steps 12 linked by dashed arrows. In the first mode no knowledge of the target websites of the phishing attack is assumed whereas the second mode makes use of features extracted from known target websites.

With respect to the components and steps 11 of the first mode, the phishing detection system 10 may comprise a URL collector 111, a potential phishing URLs storage 112, a website fetcher and classifier 113, a phishing website storage 114, a feature extractor 115, and an identified target storage 116. Each of these components may comprise suitable circuitry (including, e.g., general or dedicated processing circuitry, storage circuitry, communication-related circuitry, etc.) for performing functions or operations associated therewith, as described below.

To facilitate and/or support website filtering, input may be provided, such as from a HTTP (Hypertext Transfer Protocol) flow correlator 118 and/or from a URL pattern matching device 119, both of which in turn can receive input from a network flow monitor 117. Each of the network flow monitor 117, the HTTP flow correlator 118, and the URL pattern matching device 119 may comprise suitable circuitry (including, e.g., general or dedicated processing circuitry, storage circuitry, communication-related circuitry, etc.).

Further, with respect to the components and steps 12 of the second mode, the phishing detection system 10 may comprise a phishing target analyzer 121 and a feature provider 122, each of which may comprise suitable circuitry (including, e.g., general or dedicated processing circuitry, storage circuitry, communication-related circuitry, etc.) for performing functions or operations associated therewith, as describe below. The phishing target analyzer 121 and the feature provider 122 may provide input to any of above URL pattern matching device 119, the HTTP flow correlator 118 and the feature extractor 115.

In example operation of the above phishing detection system 10, the URL collector 111 may be used to collect URLs from sources such as emails, messages or manual inputs. The collected URLs may be transmitted to the potential phishing URLs storage 112, which stores potential phishing URLs. The websites requested by those URLs which have been identified as potential phishing URLs may be classified using the website fetcher and classifier 113. The website fetcher and classifier may employ various methods for accessing suspicious websites and assets—e.g., download elements or features thereof. The downloaded contents may be analyzed and compared to a known and trained pattern indicating a phishing website. Once a phishing website is identified, it is stored in the website storage 114, and the feature extractor 115 may be used to extract and analyze salient features of the downloaded website. These features may be, for example, compared with features as provided by the feature provider 122 to identify with the targeted website and to store the identified targeted websites in the target storage 116.

In some instances, the phishing detection system 10 as shown in FIG. 1 may implement and/or apply alternative or additional methods and means for detecting potential phishing sites. For example, the alternative or additional methods may make use of the network flow monitor 117 to monitor network traffic. The network flow monitor 117 may generate a log of the network requests, which may comprise the IP addresses of the requesting sites and of the requested sites and time stamps indicative of the time of the requests. Where the network flow is not encrypted (e.g., an http: traffic), plaintext URLs may be included in the log. Where the network flow is monitored for a single network device, the IP address of such a device may be assumed to be known and/or unchanged, and hence does not have to be monitored by the network flow monitor 117.

The logs generated by the network flow monitor 117 may be used as input to the network flow correlator 118 and/or to the URL pattern matching engine 119. In this regard, the URL pattern matching engine 119 may identify potential phishing URLs through analysis of the plaintext URLs, and allow adding identified URLs to the list of potential phishing URLs as stored in the potential phishing URLs storage 112. The network flow correlator 118 may perform a correlation analysis to identify correlated requests and responses within the network flow indicative of a phishing attack. Examples of such correlations or patterns in the network flow are described in greater detail making reference to FIG. 2.

Some phishing websites are known to not host copies of the target website's resources themselves; rather, they may directly link to the original assets of the targeted website. These assets may comprise resources like the, images, Favicon (favorite icon), and/or CSS (Cascading Style Sheet) files. Opening a phishing site of such nature in a web browser may result in a very specific behavior, which can be monitored at network level, as shown in FIG. 2.

Figure 2:
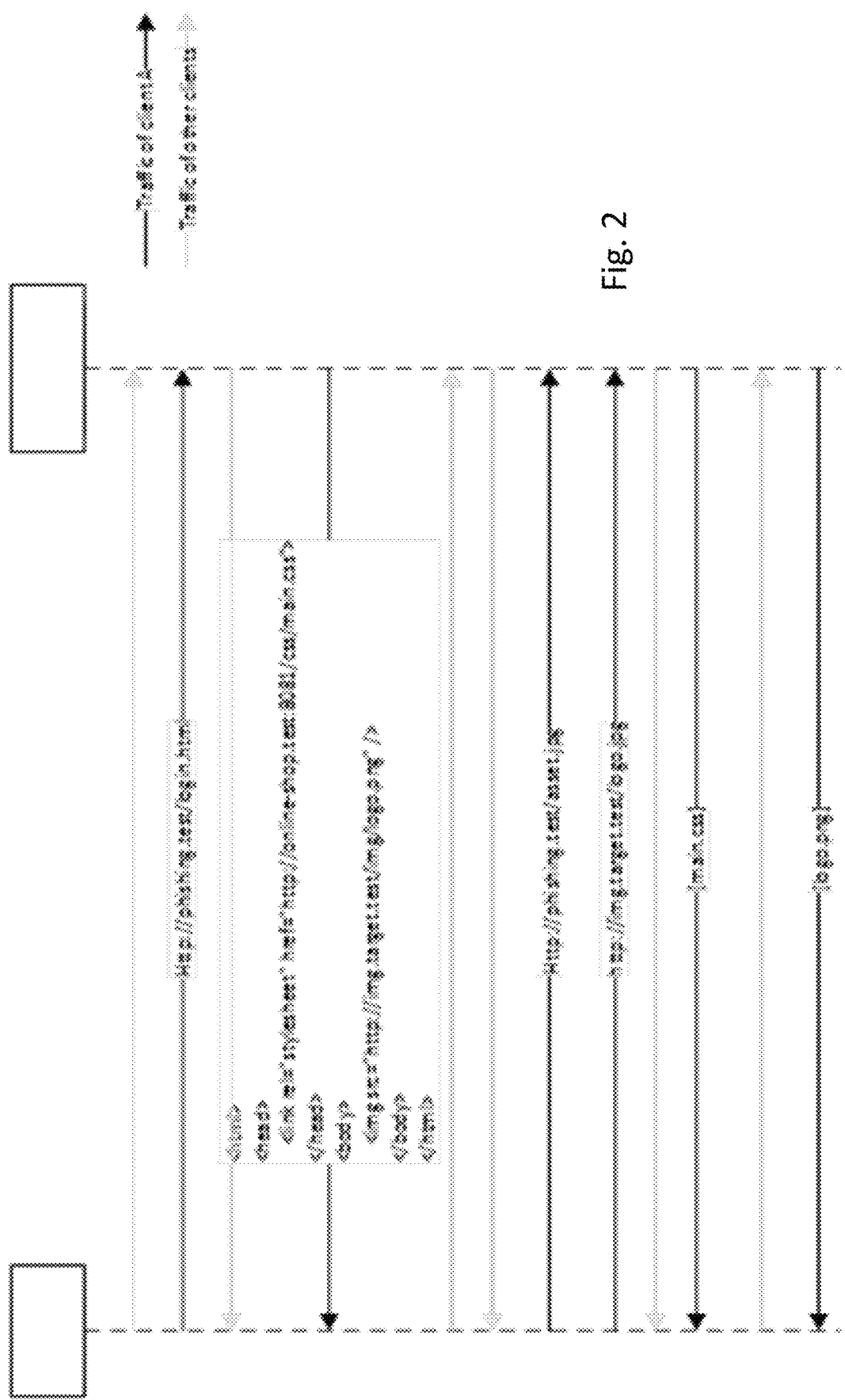
FIG. 2 illustrates example network traffic pattern, in accordance with the present disclosure.

FIG. 2 illustrates example network traffic pattern, in accordance with the present disclosure. Shown in FIG. 2, is flow chart 200 representing example network traffic. In this regard, traffic from and to a specific user, client, or site ("Client A"), as identified by its IP address, is emphasized in the flow chart 200 using black arrow within the multitude of other requests and responses in the network traffic.

The example of network traffic as represented in FIG. 2 is in form of a network flow log of time stamped network traffic events is illustrated by Table 1, below, which illustrates example network flow, for particular duration (e.g., 0.032616 seconds), at network level, e.g., as passing through a network or gateway server of an ISP (Internet Service Provider).

TABLE 1

Example network traffic

| Time | Source | Destination | HTTP Header |
|---|---|---|---|
| 0 | 192.168.3.3 | 10.22.22.22 | |
| 0.000085 | 10.22.22.22 | 192.168.3.3 | |
| 0.000545 | 192.168.3.3 | 10.22.22.22 | |
| 0.000956 | 192.168.3.3 | 10.22.22.22 | |
| 0.001053 | 10.22.22.22 | 192.168.3.3 | |
| 0.001056 | 172.16.55.5 | 10.88.88.88 | |
| 0.00108 | 10.88.88.88 | 172.16.55.5 | |
| 0.001097 | 172.16.55.5 | 10.88.88.88 | |
| 0.001178 | 172.16.55.5 | 10.88.88.88 | GET phishing.test /login.html |
| 0.001188 | 10.88.88.88 | 172.16.55.5 | |
| 0.001798 | 10.22.22.22 | 192.168.3.3 | |
| 0.002409 | 10.22.22.22 | 192.168.3.3 | 200 OK |
| 0.003057 | 192.168.3.3 | 10.22.22.22 | |
| 0.003908 | 10.88.88.88 | 172.16.55.5 | |
| 0.003923 | 172.16.55.5 | 10.88.88.88 | |
| 0.00394 | 192.168.3.3 | 10.22.22.22 | |
| 0.00394 | 10.88.88.88 | 172.16.55.5 | |
| 0.003943 | 172.16.55.5 | 10.88.88.88 | |
| 0.003958 | 10.88.88.88 | 172.16.55.5 | |
| 0.00396 | 172.16.55.5 | 10.88.88.88 | |
| 0.003967 | 10.88.88.88 | 172.16.55.5 | |
| 0.003969 | 172.16.55.5 | 10.88.88.88 | |
| 0.003973 | 10.22.22.22 | 192.168.3.3 | |
| 0.003978 | 10.88.88.88 | 172.16.55.5 | |
| 0.00398 | 172.16.55.5 | 10.88.88.88 | |
| 0.003991 | 10.88.88.88 | 172.16.55.5 | |
| 0.003992 | 172.16.55.5 | 10.88.88.88 | |
| 0.003998 | 10.88.88.88 | 172.16.55.5 | |
| 0.004 | 172.16.55.5 | 10.88.88.88 | |
| 0.004023 | 10.88.88.88 | 172.16.55.5 | 200 OK |
| 0.004287 | 172.16.55.5 | 10.88.88.88 | |
| 0.004294 | 10.88.88.88 | 172.16.55.5 | |
| 0.017247 | 172.16.55.5 | 10.22.22.22 | |
| 0.017254 | 10.22.22.22 | 172.16.55.5 | |
| 0.017261 | 172.16.55.5 | 10.22.22.22 | |
| 0.018097 | 172.16.55.5 | 10.22.22.22 | GET target.test /css/main.css |
| 0.018119 | 10.22.22.22 | 172.16.55.5 | |
| 0.018336 | 10.22.22.22 | 172.16.55.5 | |
| 0.01834 | 172.16.55.5 | 10.22.22.22 | |
| 0.018352 | 10.22.22.22 | 172.16.55.5 | |
| 0.018354 | 172.16.55.5 | 10.22.22.22 | |
| 0.018368 | 10.22.22.22 | 172.16.55.5 | |
| 0.01837 | 172.16.55.5 | 10.22.22.22 | |
| 0.018377 | 10.22.22.22 | 172.16.55.5 | |
| 0.018379 | 172.16.55.5 | 10.22.22.22 | |
| 0.018387 | 10.22.22.22 | 172.16.55.5 | |
| 0.018389 | 172.16.55.5 | 10.22.22.22 | |
| 0.018399 | 10.22.22.22 | 172.16.55.5 | |
| 0.0184 | 172.16.55.5 | 10.22.22.22 | |
| 0.018406 | 10.22.22.22 | 172.16.55.5 | 200 OK |
| 0.018407 | 172.16.55.5 | 10.22.22.22 | |
| 0.018646 | 10.22.22.22 | 172.16.55.5 | |
| 0.018652 | 10.22.22.22 | 172.16.55.5 | |
| 0.018754 | 172.16.55.5 | 10.22.22.22 | |
| 0.018759 | 10.22.22.22 | 172.16.55.5 | |
| 0.018763 | 172.16.55.5 | 10.22.22.22 | |
| 0.018837 | 172.16.55.5 | 10.22.22.22 | GET target.test /img/logo.png |
| 0.01885 | 10.22.22.22 | 172.16.55.5 | |
| 0.018982 | 10.22.22.22 | 172.16.55.5 | |
| 0.018986 | 172.16.55.5 | 10.22.22.22 | |
| 0.018995 | 10.22.22.22 | 172.16.55.5 | |
| 0.018998 | 172.16.55.5 | 10.22.22.22 | |
| 0.01901 | 10.22.22.22 | 172.16.55.5 | |
| 0.019011 | 172.16.55.5 | 10.22.22.22 | |
| 0.019017 | 10.22.22.22 | 172.16.55.5 | |
| 0.019018 | 172.16.55.5 | 10.22.22.22 | |
| 0.019026 | 10.22.22.22 | 172.16.55.5 | |
| 0.019027 | 172.16.55.5 | 10.22.22.22 | |
| 0.019036 | 10.22.22.22 | 172.16.55.5 | |
| 0.019038 | 172.16.55.5 | 10.22.22.22 | |
| 0.019043 | 10.22.22.22 | 172.16.55.5 | 200 OK |
| 0.019044 | 172.16.55.5 | 10.22.22.22 | |
| 0.019203 | 172.16.55.5 | 10.22.22.22 | |
| 0.019209 | 10.22.22.22 | 172.16.55.5 | |
| 0.027165 | 192.168.3.3 | 10.22.22.22 | GET target.test |
| 0.027211 | 10.22.22.22 | 192.168.3.3 | |
| 0.027593 | 192.168.3.3 | 10.22.22.22 | |
| 0.027963 | 192.168.3.3 | 10.22.22.22 | |
| 0.027984 | 10.22.22.22 | 192.168.3.3 | |
| 0.028197 | 192.168.3.3 | 10.22.22.22 | GET target.test /css/main.css |
| 0.028256 | 10.22.22.22 | 192.168.3.3 | |
| 0.028636 | 192.168.3.3 | 10.22.22.22 | |
| 0.029084 | 10.22.22.22 | 192.168.3.3 | |
| 0.029218 | 192.168.3.3 | 10.22.22.22 | GET target.test /img/logo.png |
| 0.02923 | 10.22.22.22 | 192.168.3.3 | |
| 0.030568 | 10.22.22.22 | 192.168.3.3 | 200 OK |
| 0.030994 | 10.22.22.22 | 192.168.3.3 | |
| 0.031166 | 10.22.22.22 | 192.168.3.3 | 200 OK |
| 0.031449 | 192.168.3.3 | 10.22.22.22 | |
| 0.03147 | 192.168.3.3 | 10.22.22.22 | |
| 0.032097 | 192.168.3.3 | 10.22.22.22 | |
| 0.0322 | 10.22.22.22 | 192.168.3.3 | |
| 0.032368 | 192.168.3.3 | 10.22.22.22 | |
| 0.032616 | 10.22.22.22 | 192.168.3.3 | |

In Table 1 the participants in the monitored network traffic are Client A with, for example, IP address 172.16.55.5, which represents a user targeted by a phishing attack, and a network peer ("Client B") with, for example, IP address 192.168.3.3, representing another user not targeted by a phishing attack. Address 10.22.22.22 is the IP address of the target "target.test", which may be a web shop or banking site, and 10.88.88.88 is the IP address of the phishing website "phishing.test", which attempts to target the users and the web site of the target target.test.

Looking at the traffic to and from Client A, first the main phishing site phishing.test is requested from the phishing site's web server. The phishing sites server responds with a web site code as shown in simplified form in FIG. 2 and Table 1. After the initial response by the phishing sites server, all related elements or assets of the web site are requested, some of which are hosted by the same server and some of which are hosted by the target website's server target.test. The network flow to and from Client B, who genuinely addresses the target site, shows no such pattern Looking at the requests and responses in the log of Table 1 in detail the following network traffic events may be observed:

1) At 0.001178s a user with the IP address 172.16.55.5 (Client A) requests the web site with the IP address 10.88.88.88 (phishing.test).

2) At 0.018097s the user with IP address 172.16.55.5 requests an asset (here: /css/main.css) of the website with the IP address 10.22.22.22 (target.test).

3) At 0.018837s the user 172.16.55.5 addresses 10.22.22.22 to requests an asset (here: /img/logo.png).

4) At 0.027165s another client with IP address 192.168.3.3 (Client B) accesses the web site with the IP address 10.88.88.88 10.22.22.22.

5) At 0.028197s the user with IP address 192.168.3.3 requests an asset (here: /css/main.css) of the website with the IP address 10.22.22.22.

6) At 0.029218s the user with IP address 192.168.3.3 requests an asset (here: /img/logo.png) of the website with the IP address 10.22.22.22.

While backtracking the network flow of Client A from a call to a targeted website 10.22.22.22, it may be observed that Client A accessed a different web site 10.88.88.88 (phishing.test/login.html) only 0.017 s before calling up assets from the targeted site. When backtracking the network flow from and to Client B, who also accessed the targeted site, no such call of a different site is observed within the logged time window. The sudden change of accessed sites makes the initial IP address suspicious and hence this IP address and/or URL may be added to the list of potential phishing site for further analysis.

Thus, from a network traffic's point of view, all URLs of requests from one unique client that occur simultaneously with requests to a different web server not related to the phishing site's server but to a different server (which in a phishing attack of the kind described above is a server related to the target web server target.test) are potential phishing candidates. As shown in the log of Table 1 the relevant requests and responses are typically within a time window of less than is or even less than 0.1 s.

The above example illustrates that using the steps of registering network traffic, for example in the form of destination and targets in a time resolved manner of the web or IP calls from and to a single user destination, and detecting within the registered destination and targets a short uncorrelated call pattern, where the uncorrelated call pattern includes one or more user calls to a website or websites not linked to the requested site following the response to a user call to a requested site, may be used to automate the detection of phishing attacks.

A user or a website is identified in the network flow typically by its network address or terminal ID but other traffic address identification means such as HTTP Header Enrichment or X-USER-ID may also be used, if available.

The short call pattern may be characterized as being short in time, e.g., as within a predefined time window of preferably between 0.1 and 10 seconds or being short in the registered network traffic, e.g., with very few or no intermediate calls, preferably less than 5 or 3, between the calls forming part of the call pattern or both. To avoid being dependent on the latency of the network, time may be measured as the time between receiving a response from a server, (which may be a phishing site) by a user and subsequent requests from that user. This time is not network dependent but only of the speed of the user side network or of the user's device if the monitoring is restricted to a single device.

The detection system for the automated detection of phishing attacks may comprise components for analyzing network traffic flow, such as the network flow monitor 117 and the HTTP flow correlator 118, which may be operable to monitor network traffic, for example in the form of destination and targets in a time resolved manner of the web or IP calls from and to a single user destination, and detect within the registered destination and targets a short uncorrelated call pattern where the uncorrelated call pattern includes one or more user calls to a website or websites not linked to the requested site following the response to a user call to a requested site.

This above approach may allow finding phishing URLs that would seem to be legitimate and would not raise any suspicion when using other detection methods. It is even possible in accordance with the present disclosure to detect a potential phishing server (identified by its IP address) when the traffic is SSL (Secure Sockets Layer) encrypted. If the server name identification extension is used during the SSL handshake, or if the corresponding DNS (Domain Name System) traffic is available, even the phishing website's domain name may be identified.

The network traffic flow monitoring 117 and the HTTP flow correlator 118 may be performed wherever client network traffic may be monitored. This may be at a client's computer (e.g., as a web browser extension or as part of a software firewall), within a client's network (e.g., hardware firewall, router, or modem), or within an ISP's network.

Thus, in accordance with the present disclosure, methods and systems as described above may be capable of issuing warnings or blocking suspicious websites in real-time or quasi real-time, e.g., before the user may enter the information being phished. Therefore, such a warning or blocking step may be part of the above described methods.

Further, in accordance with the present disclosure, methods and systems as described may operate with a known set of target web sites, which may then be specifically protected when observing the network flow. On the other hand it is also possible to monitor the network flow for the above described correlations or pattern without a specific knowledge of the target.

While the above described methods and systems are capable of detecting certain phishing attacks in a robust, fast and easy to implement manner, further aspects of the disclosure include the combination of the above methods and systems with conventional known methods and systems of detecting phishing attacks, using for example a comparison against known phishing web sites or the analysis of other known hallmarks of phishing websites.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular embodiment disclosed, but that the present disclosure will include all embodiments falling within the scope of the appended claims.

What is claimed is:

1. A method for automatic detection of phishing websites, comprising:
    monitoring network traffic;
    detecting within the network traffic a sequence of network traffic events, wherein such sequence comprises:
        an initial request from a network address to a first requested network address;
        a first response to the initial request from the first requested network address at a first time; and
        a second request from the network address to a second requested network address at a second time subsequent to the first time;
    classifying the first requested network address as a potential phishing website;
    wherein the classifying comprises:
        determining that the second requested network address is not related to the first requested network address; and
        determining that a time difference between the second time and the first time is smaller than a defined time value, wherein the defined time value is smaller than a time lapse between a change from one requested network address to another when such change is initiated by a human user; and
    taking one or more protective measures in response to the classifying, wherein the one or more protective measures comprises blocking the first requested network address.

2. The method of claim 1, comprising monitoring the network traffic using a log of network traffic events.

3. The method of claim 2, wherein the log has a machine readable log format, and comprises network addresses of requested and/or responding sites.

4. The method of claim 1, wherein the defined time value is smaller than 1 second, and preferably smaller than 0.1 seconds.

5. The method of claim 1, wherein the second request is within a limited number of network events relative to the first time; and comprising
    classifying the first requested network address as a potential phishing website based on a determination that the limited number of network events is smaller than a defined limit value.

6. The method of claim 5, wherein the defined limit value is 5 or 3.

7. A method for protecting websites from phishing attacks, comprising:
    monitoring network traffic;
    detecting within the network traffic a request from a requesting network address to a target website;
    evaluating network events involving the requesting network address prior to the detected request to detect a request by the requesting network address to a website not related to the target website, wherein:
        the evaluating comprises obtaining time measurements that are independent of network latency;
        the evaluation is limited to network traffic events involving the requesting network address within a time window; and
        the time window is smaller than a time lapse between a change from one requested network address to another when such change is initiated by a human user;
    classifying the prior requested website as potential phishing website; and
    taking one or more protective measures in response to the classifying, wherein the one or more protective measures comprises blocking the prior requested website.

8. The method of claim 7, comprising monitoring the network traffic using a log of network traffic events generated based on the network traffic.

9. The method of claim 8, wherein the log has a machine readable log format, and comprises network addresses of requested and/or responding sites.

10. The method of claim 7, wherein the evaluation is limited to network traffic events involving the requesting network address within a limited number of network traffic events in a sequence of network traffic events.

11. The method of claim 10, wherein the limited number of network traffic events is 5 or 3.

12. The method of claim 10, wherein the time window is smaller than 1 second, and preferably smaller than 0.1 seconds.

13. A system for the automated detection of phishing attacks, comprising:
    a network traffic monitor that monitors network traffic;
    a network flow correlator that detects within the network traffic a sequence of network traffic events, wherein such sequence comprises:
        an initial request from a network address to a first requested network address;
        a first response to the initial request from the first requested network address at a first time; and
        a second request from the network address to a second requested network address at a second time subsequent to the first time; and
    a website classifier that classifies the first requested network address as a potential phishing website; wherein the classifying comprises:
        a determination that the second requested network address is not related to the first requested network address, and
        a determination that a time difference between the second time and the first time is smaller than a defined time value, wherein the defined time value is smaller than a time lapse between a change from one requested network address to another when such change is initiated by a human user; and
    wherein the system takes one or more protective measures in response to the classifying, wherein the one or more protective measures comprises blocking the first requested network address.

14. The system of claim 13, wherein the network traffic monitor generates a log of network traffic events for use during monitoring the network traffic.

15. The system of claim 14, wherein the log has a machine readable log format, and comprises network addresses of requested and/or responding sites.

16. The system of claim 13, further comprising an address collector that collects addresses corresponding to requested and/or responding sites from one or more different sources.

17. The system of claim 13, further comprising a pattern matching engine that identifies potential phishing addresses based on analysis of addresses in plaintext logs.

18. The system of claim 13, further comprising a feature extractor that extracts and analyzes features of particular websites.

19. The system of claim 18, wherein the feature extractor compares extracted features for a particular website with pre-stored website features to identify the particular website.

20. The system of claim 13, wherein the second request is within a limited number of network events relative to the first time; and wherein the website classifier classifies the first requested network address as a potential phishing website based on a determination that the limited number of network events is smaller than a defined limit value.

* * * * *